United States Patent Office 3,534,103
Patented Oct. 13, 1970

3,534,103
PREPARATION OF ALDEHYDES FROM OLEFINS
Lawrence J. Kehoe, Ferndale, Mich., assignor to Ethyl Corporation, New York, N.Y., a corporation of Virginia
No Drawing. Filed Mar. 30, 1967, Ser. No. 626,960
Int. Cl. C07c *45/10*
U.S. Cl. 260—604
6 Claims

ABSTRACT OF THE DISCLOSURE

Aldehydes are prepared by reacting carbon monoxide with an olefin and an alcohol in the presence of a ruthenium halide catalyst. For example, when dodecene-1 is reacted with methanol and carbon monoxide in the presence of a catalytic quantity of ruthenium (III) chloride, a product comprising $C_{13}$-aldehydes results. As a by-product, the alcohol corresponding to the aldehyde is also produced in many instances.

BACKGROUND OF THE INVENTION

This invention relates to the preparation of aldehydes from an olefin and an alcohol. Stated another way, this invention relates to a catalytic method for introducing a carbonyl group into a molecule.

Carbonyl insertion reactions are known. For example, Blackham U.S. 3,119,861 teaches preparation of β-chloropropionyl chloride from palladium (II) chloride, ethylene, and carbon monoxide. Ethylene palladium chloride dimer

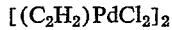

is a reactive intermediate in this process. According to Alderson et al., U.S. 3,065,242, acid chlorides are produced by reacting olefins, hydrogen chloride, and carbon monoxide. As catalysts, Alderson et al. use Group VIII noble metal salts, chelates and carbonyls. Brubaker U.S. 2,680,763 teaches a wide variety of reaction between carbon monoxide, chain transfer agents, and olefins. As catalysts, Brubaker employs radical forming substances, and in one instance, cobalt carbonyl.

SUMMARY OF THE INVENTION

The heart of this invention comprises the catalytic preparation of aldehydes from olefins, carbon monoxide, and alcohols. The reaction rate is enhanced by elevated pressures and temperatures. The aldehyde products can be reduced to alcohols and then used in the preparation of plasticizers or detergents.

DESCRIPTION OF PREFERRED EMBODIMENTS

A most preferred embodiment is described as follows: The process for the preparation of aldehydes, said process comprising reacting carbon monoxide, a straight chain paraffinic α-monoolefin having 6 to 20 carbon atoms, a straight chain paraffinic monohydric alcohol having up to 10 carbon atoms; said process being conducted at a temperature within the range of from about 200° to about 300° C. and at a pressure within the range of from about 1000 to about 6000 p.s.i.g., said process being carried out in the presence of a catalytic quantity of a simple ruthenium (III) halide.

As mentioned immediately above, a preferred embodiment comprises use of olefins of about six to about 20 carbon atoms. The reason for this is that these olefins are comparatively inexpensive and generally readily available. However, there is no known critical dependence on the size of the olefin; therefore, olefins having a greater or lesser number of carbon atoms can be used, if desired. By the same token, internal olefins can be used in this process. Terminal olefins are preferred, since in many instances, the products produced therefrom are of greater commercial value. The olefin need not be pure. Not only can it be admixed with other classes of substances which do not hinder the process, but olefin mixtures can be employed as starting materials.

Stable olefins are preferred in the process of this invention. An olefin is stable if the organic radicals bonded to the olefinic carbon atoms are not destroyed during the process. In other words, the preferred organic radicals are not altered by an extraneous or competitive side reaction and the product must be stable in the resultant reaction mixture to a significant degree. Furthermore, the organic radical or radicals attached to the doubly bonded carbon atoms must not prevent the formation of the desired product by reacting with the process reactants. Moreover, the olefin must not contain a radical which is so bulky as to unduly retard the process by steric hindrance. In other words, the double bond must be unhindered.

Applicable olefinic linkages are those which are not incorporated with an aromatic system. In other words, applicable double bonds are present within an aliphatic or alicyclic radical. However, applicable olefins include those which contain an aromatic side chain bonded to one or more of the double bonded aliphatic or alicyclic carbon atoms.

Non-conjugated aliphatic straight-chain olefins which contain a double bond in a terminal position are preferred examples of these preferred olefins are heptene-1, octene-1, tetradecene-1, eicosene-1, and the like. Highly preferred olefins are the straight-chain alpha-olefins having 6 to 20 carbon atoms. The most preferred straight-chain olefins are hexene-1 and dodecene-1.

In general, the alcohol which may be used in this process can be any primary or secondary alcohol having up to 18 carbon atoms. It is preferred, however, that the alcohol be acyclic and have 12 carbon atoms or less and be free of carbon-to-carbon unsaturation. Although functional groups may be present in the alcohol molecule, as for example, chlorine, bromine, iodine or fluorine (e.g. ethylenechlorohydrin and 5-bromohexan-1-ol), it is preferred that the alcohol is free of any functional groups (other than the hydroxy radical or radicals). Thus, the most preferred alcohols are those which have an organic group (bonded to the hydroxy radical or radicals) solely composed of carbon and hydrogen.

Although carbocyclic alcohols such as cyclohexanol or phenol may be used, it is preferably to employ acyclic alcohols. Polyhydroxy radicals such as hexylene glycol, 1,3-butanediol, and 1,4-butanediol, may be successfully employed in the instant process. When using a polyhydric alcohol it is preferred that the hydroxy groups should be separated by at least one carbon atom as in a 1,3-diol, and more preferably, by at least two carbon atoms as in a 1,4-diol. Monohydric alcohols, however, are more preferred than polyhydric alcohols.

The preferred group of alcohols which may be advantageously employed in the process of this invention are monohydric alcohols wherein the hydroxy radical is bonded to an organic group of from 1 to about 12 carbon atoms through a carbon atom of said group which is bonded to at least one hydrogen atom, said organic group being acyclic, solely composed of carbon and hydrogen, and free of carbon-to-carbon unsaturation. Thus, the preferred alcohols are primary or secondary paraffinic monohydric alcohols such as methyl alcohol, ethyl alcohol, n-propyl alcohol, isopropyl alcohol, n-butyl alcohol, isobutyl alcohol, sec-butyl alcohol, n-amyl alcohol, isoamyl alcohol, n-hexyl alcohol, n-octyl alcohol, capryl alcohol (octanol-2), n-decyl alcohol, lauryl alcohol, myristyl alcohol, cetyl alcohol, and stearyl alcohol.

The alcohol does not appear in the aldehyde or alcohol products produced by the process of this invention. Presumably the function of the alcohol is to furnish hydrogen which can be used as in the following illustrative but non-limiting equation.

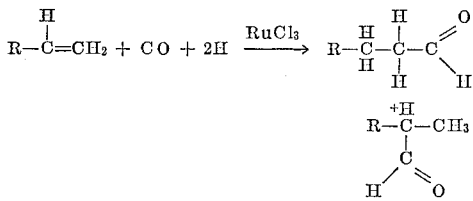

Very highly preferred alcohols of the above types are the primary alcohols having from up to about 10 carbon atoms, and the more preferred ones are methanol, ethanol and isopropanol. Of these, the most preferred is methanol.

Simple ruthenium halides are employed as catalysts in this invention. The trivalent or tetravalent forms of these materials can be used. Preferably, a ruthenium chloride or bromide is employed, most preferably ruthenuim (III) chloride. The halide is usually charged to the reaction vessel in amounts up to 15 percent by weight of the olefin employed. Greater or lesser amounts can be used; usually from 0.1 to 0.0001 mole of ruthenium halide are employed for each mole of olefin. Preferably, from 0.05 to 0.005 mole of halide per each mole olefin is used.

Although not bound by any theory, one molecule each of carbon monoxide and alcohol combine with each double bond reacted. Although the process of this invention can be carried out by using the reactants in this ratio, it is not necessary to do so. Other ratios frequently are employed. For example, when the reaction is carried out in the presence of a liquid phase, I frequently employ an excess of alcohol. The excess acts as a solvent and dispersing medium. The amount of excess is not critical and is governed to some extent by equipment design, solubility of the products and other reactants, and ease of separation of the desired product. Thus, up to 30 or 40 or more moles of alcohol per mole of olefin can be employed, if desired.

It has been found that an excess of carbon monoxide frequently increases the yield. Hence, from about 1.5 to about 15 moles of carbon monoxide per mole of double bond to be reacted is usually used. Preferably, from about 2 to about 12 moles and most preferably from about 3 to about 10 moles of carbon monoxide per mole of double bond are employed.

Thus, if the olefin is a monoolefin, from about 3 to about 10 moles of carbon monoxide per mole of olefin are preferably employed. Similarly, if the olefin is a diolefin, preferably from about 6 to about 20 moles of carbon monoxide per mole of olefin is used.

This process can be carried out in the presence of inert ingredients. For example, it can be carried out in the presence of a solvent and/or dispersing medium which does not enter into the reaction. Preferably, the solvent-dispersing medium is an inert organic liquid such as an ether, hydrocarbon, or mixture thereof. Typical ethers which can be employed are either cyclic or straight-chain ethers such as tetrahydrofuran, dioxane, dimethoxyethane, diethyleneglycol dimethylether, and the like. Hydrocarbons which can be employed can be either aliphatic or aromatic. Typical applicable hydrocarbons are cyclohexane, benzene, toluene, isooctane, No. 9 oil, kerosene, petroleum ether, and the like.

The process is conducted at a reaction temperature within the range of from about 80° to about 300° C. A preferred temperature range is from about 225° to about 250° C.

The process is carried out under elevated pressures. Pressures within the range of from about 100 to about 10,000 p.s.i. are employed. Preferred pressures are within the range of from about 2000 to about 8000 p.s.i. Pressures within the range of from about 2500 to about 5000 p.s.i. are highly preferred.

The reaction time required by the process is not a truly independent variable and is dependent to some extent on the nature of the olefin and the products and upon other process variables under which the reaction is conducted. For example, when high pressures and high temperatures are used, the reaction time is usually reduced. Similarly, low temperature and low pressures usually require a longer reaction time. In general, a reaction time within the range of from about 2 to 48 hours is used.

When the reaction is carried out in the presence of a liquid phase, it is preferred to agitate the reaction mixture. Agitation is not essential, but is preferred since it affords a smooth reaction rate and tends to increase the rate of reaction. When the reaction is to be carried out as a continuous vapor-phase process, the catalyst (in a fine state of division) is frequently dispersed on an inert matrix.

The products are isolated from the reaction mixture by methods known in the art. For example, the products can be isolated by distillation, extraction, chromatography, fractional crystallization, and other similar procedures.

The process of this invention is illustrated by the following non-limiting examples in which all parts are by weight.

EXAMPLE 1

To a suitable pressure vessel was charged 16.8 parts of dodecene-1, 22 parts of methanol and 0.21 part of ruthenium (III) chloride. The vessel was sealed and pressured to 3000 p.s.i.g. at 18° and then heated to 225° C. After maintaining the reaction mixture at that temperature for 12 hours the pressure had dropped 666 p.s.i.g.

After cooling and venting the vessel, its contents, consisting of two layers and a precipitate, were recovered. This material was treated with sufficient acetone to result in a one-layer system and a precipitate. The precipitate was removed. Vapor phase chromatographic analysis of the liquid portion indicated that the major product was $C_{13}$ branched aldehyde.

EXAMPLE 2

To a stainless steel pressure vessel is charged 16.8 parts of random dodecene. Twenty-two parts of methanol and 0.21 part of ruthenium (III) chloride. The reaction vessel is pressured to 2800 p.s.i.g. and then heated to 225° C. for 30 minutes and to 250° C. for 12 hours. A pressure drop occurs.

After cooling and venting, the reaction vessel is discharged, yielding a reaction mixture similar to that in Example 1. A similar work-up procedure yields a mixture of $C_{13}$ aldehydes.

EXAMPLE 3

Following the procedure of the above examples, a $C_{12}$ olefin fraction consisting of propylene tetramer is reacted with carbon monoxide and ethanol at 300° C. The reaction vessel is initially pressured with carbon monoxide so that upon reaching 300° C. the pressure is 6000 p.s.i.g. A product comprising mixed $C_{13}$ aldehydes and alcohols is produced. When hexene-1 is the olefin employed, $C_7$ aldehydes are produced.

EXAMPLE 4

Propylene and isobutylene are copolymerized with a phosphoric acid catalyst and the resultant product fractionated to yield a cut broiling between 76 and 99° C. This product is formylated by reaction at 200° C. and an initial carbon monoxide pressure (at that temperature) of 1000 p.s.i.g. The alcohol employed is ethanol; the catalyst is ruthenium tetrachloride.

After 48 hours the pressure vessel is vented to atmospheric pressure and discharged.

The product is hydrogenated using hydrogen and Raney nickel as a catalyst. There is obtained a mixture $C_8$ alcohols which is useful in the manufacture of plasticizers. The alcohol product comprises 3,5-dimethyl hexanol, 4,5-dimethyl hexanol, 3,4-dimethyl hexanol, 3-methyl heptanol, and 4-methyl heptanol.

Similar results are obtained when the formylation step is carried out using ruthenium (III) bromide when the alcohol is either n-hexanol or n-dodecanol.

Using the procedure of the above example, $C_{21}$ alcohols are produced when the starting material is eicosene-1 and n-decanol is used as the alcohol. When diisobutylene is formylated using the above procedure, $C_9$ alcohols useful in plasticizer production are produced.

As already indicated, the product of this invention can be treated to yield alcohols which are useful as chemical intermediates. Thus, for example, $C_6$–$C_{10}$ range products obtained by this invention can be transformed to the corresponding alcohols and these reacted with phthalic acid or phthalic anhydride to produce plasticizers. By the same token, the $C_{11}$–$C_{20}$ alcohols produced by this invention can be sulfonated to produce valuable detergents.

As inferred above, many of the products produced by this invention are known compounds, and they have the many utilities known for them.

Having fully described the novel process of this invention, its products, and the utility thereof, it is desired that the scope of the invention be limited only to the lawful extent of the appended claims.

What is claimed is:

1. Process for the preparation of aldehydes, said process consisting essentially of reacting carbon monoxide, a straight chain alpha monoalkene having 6 to 20 carbon atoms, a straight chain alkanol having up to 10 carbon atoms; said process being conducted at a temperature within the range of from about 200° C. to about 300° C. and at a pressure within the range of from about 1000 to about 6000 p.s.i.g.; said process being carried out in the presence of from 0.1 to 0.0001 mole, per mole of said olefin of a catalyst selected from ruthenium (III) bromide and ruthenium (III) chloride.

2. The process of claim 1 wherein said ruthenium halide is ruthenium (III) chloride.

3. The process of claim 2 wherein said olefin is dodecene-1.

4. The process of claim 1 wherein said alkanol is methanol.

5. The process of claim 2 wherein said alkanol is methanol.

6. The process of claim 3 wherein said alkanol is methanol.

References Cited

UNITED STATES PATENTS

| | | | |
|---|---|---|---|
| 2,763,693 | 9/1956 | Vander Woude et al. | 260—604 |
| 2,694,735 | 11/1954 | Hull et al. | 260—604 |
| 2,691,046 | 10/1954 | Hasek | 260—604 |
| 2,876,254 | 3/1959 | Jenner et al. | 260—597 |
| 3,040,090 | 6/1962 | Alderson et al. | 260—483 |
| 3,020,314 | 2/1962 | Alderson | 260—604 X |

FOREIGN PATENTS

| | | |
|---|---|---|
| 966,482 | 8/1964 | Great Britain. |

BERNARD HELFIN, Primary Examiner

R. H. LILES, Assistant Examiner

U.S. Cl. X.R.

260—598; 252—472